US005500023A

United States Patent [19]

Koike et al.

[11] Patent Number: 5,500,023

[45] Date of Patent: Mar. 19, 1996

[54] INK-JET PRINTING PROCESS, INK SET FOR USE IN SUCH PROCESS, AND PROCESSED ARTICLE OBTAINED THEREBY

[75] Inventors: Shoji Koike, Yokohama; Masahiro Haruta, Tokyo; Koromo Shirota, Inagi; Tomoya Yamamoto; Mariko Suzuki, both of Kawasaki, all of Japan

[73] Assignee: Canon Kabushiki Kaisha, Tokyo, Japan

[21] Appl. No.: 229,341

[22] Filed: Apr. 18, 1994

[30] Foreign Application Priority Data

Apr. 21, 1993 [JP] Japan .................................... 5-094207
Apr. 21, 1993 [JP] Japan .................................... 5-094208

[51] Int. Cl.[6] ............................. D06P 5/00; C09D 11/02; B41J 2/01

[52] U.S. Cl. ......................... 8/499; 8/543; 8/549; 8/638; 8/918; 8/924; 8/930; 8/933; 8/DIG. 2; 101/171; 106/22 R; 106/20 D; 347/96; 347/100; 347/101

[58] Field of Search ............................... 8/478, 485, 499, 8/531, 543, 549, 638, 918, 924, 930, 933, DIG. 2; 101/171, 172, 211; 106/22 R, 20 D; 347/6, 7, 9, 96, 100, 101

[56] References Cited

U.S. PATENT DOCUMENTS

| | | | |
|---|---|---|---|
| 3,942,342 | 5/1974 | Klein et al. | 8/485 |
| 4,557,761 | 12/1985 | Kobayashi et al. | 106/22 |
| 4,585,484 | 4/1986 | Haruta et al. | 106/22 |
| 4,622,041 | 11/1986 | Nichols, Jr. | 8/485 |
| 4,632,703 | 12/1986 | Koike et al. | 106/22 |
| 4,655,834 | 4/1987 | Haruta et al. | 106/20 |
| 4,655,835 | 4/1987 | Haruta et al. | 106/20 |
| 4,661,158 | 4/1987 | Kobayashi et al. | 106/22 |
| 4,677,445 | 6/1987 | Haruta | 346/1.1 |
| 4,689,078 | 8/1987 | Koike et al. | 106/22 |
| 4,702,742 | 10/1987 | Iwata et al. | 8/495 |
| 4,725,849 | 2/1988 | Koike et al. | 346/1.1 |
| 4,804,411 | 2/1989 | Eida et al. | 106/22 |
| 4,838,938 | 6/1989 | Tomida et al. | 106/22 |
| 4,849,770 | 7/1989 | Koike et al. | 346/1.1 |
| 4,853,036 | 8/1989 | Koike et al. | 106/20 |
| 4,864,324 | 9/1989 | Shirota et al. | 346/1.1 |
| 4,923,515 | 5/1990 | Koike et al. | 106/22 |
| 4,957,553 | 9/1990 | Koike et al. | 106/20 |
| 4,965,612 | 10/1990 | Sakaki et al. | 346/1.1 |
| 4,969,951 | 11/1990 | Koike et al. | 106/22 |
| 5,017,227 | 5/1991 | Koike et al. | 106/22 |
| 5,053,078 | 10/1991 | Koike et al. | 106/22 |
| 5,059,246 | 10/1991 | Yamamoto et al. | 106/22 |
| 5,067,980 | 11/1991 | Koike et al. | 106/22 |
| 5,074,914 | 12/1991 | Shirota et al. | 106/22 |
| 5,075,699 | 12/1991 | Koike et al. | 346/1.1 |
| 5,082,496 | 1/1992 | Yamamoto et al. | 106/22 |
| 5,099,255 | 3/1992 | Koike et al. | 346/1.1 |
| 5,101,217 | 3/1992 | Iwata et al. | 346/1.1 |
| 5,102,459 | 4/1992 | Ritter et al. | 8/549 |
| 5,110,356 | 5/1992 | Shirota et al. | 106/22 |
| 5,118,351 | 6/1992 | Shirota et al. | 106/22 |
| 5,123,960 | 6/1992 | Shirota et al. | 106/22 |
| 5,124,718 | 6/1992 | Koike et al. | 346/1.1 |
| 5,127,946 | 7/1992 | Eida et al. | 106/22 |
| 5,130,723 | 7/1992 | Yamamoto et al. | 346/1.1 |
| 5,135,570 | 8/1992 | Eida et al. | 106/22 |
| 5,135,571 | 8/1992 | Shirota et al. | 106/22 |
| 5,139,573 | 8/1992 | Yamamoto et al. | 106/22 |
| 5,141,558 | 8/1992 | Shirota et al. | 106/22 |
| 5,151,128 | 9/1992 | Fukushima et al. | 106/20 |
| 5,167,703 | 12/1992 | Eida et al. | 106/22 K |
| 5,178,671 | 1/1993 | Yamamoto et al. | 106/22 K |
| 5,190,581 | 3/1993 | Fukushima et al. | 106/20 D |
| 5,213,614 | 5/1993 | Eida et al;. | 106/22 K |
| 5,215,577 | 6/1993 | Eida et al. | 106/22 K |
| 5,215,578 | 6/1993 | Eida et al. | 106/22 K |
| 5,216,437 | 6/1993 | Yamamoto et al. | 346/1.1 |
| 5,220,347 | 6/1993 | Fukushima et al. | 346/1.1 |
| 5,221,333 | 6/1993 | Shirota et al. | 106/20 D |
| 5,231,417 | 7/1993 | Shirota et al. | 346/1.1 |
| 5,248,991 | 9/1993 | Shirota et al. | 346/1.1 |
| 5,250,121 | 10/1993 | Yamamoto et al. | 106/22 R |
| 5,254,157 | 10/1993 | Koike et al. | 106/20 D |
| 5,257,036 | 10/1993 | Koike et al. | 346/1.1 |
| 5,258,066 | 11/1993 | Kobayashi et al. | 106/22 R |
| 5,258,505 | 11/1993 | Eida et al. | 534/680 |
| 5,296,022 | 3/1994 | Kobayashi et al. | 106/20 D |

FOREIGN PATENT DOCUMENTS

| | | |
|---|---|---|
| 0534660 | 9/1992 | European Pat. Off. . |
| 0534428 | 9/1992 | European Pat. Off. . |
| 3642571 | 6/1987 | Germany . |
| 62-161541 | 7/1987 | Japan . |
| 63-168382 | 7/1988 | Japan . |
| 3-46589 | 7/1991 | Japan . |

*Primary Examiner*—Paul Lieberman
*Assistant Examiner*—Caroline L. Dusheck
*Attorney, Agent, or Firm*—Fitzpatrick, Cella, Harper & Scinto

[57] ABSTRACT

Disclosed herein is an ink-jet printing process comprising at least the steps of:

(a) successively applying, as ink droplets, at least two inks of different colors to a cloth to form a color-mixed portion;

(b) subjecting the cloth to a heat treatment to fix dyes contained in the inks to the cloth; and (c) washing the cloth to remove unfixed dyes from the cloth, wherein the inks comprise water, an organic solvent and individual reactive dyes different from each other in reaction rate, and the volume of a droplet of the ink containing a slower-reacting dye is made smaller upon the application of the inks.

38 Claims, No Drawings

INK-JET PRINTING PROCESS, INK SET FOR USE IN SUCH PROCESS, AND PROCESSED ARTICLE OBTAINED THEREBY

BACKGROUND OF THE INVENTION

1. Field of the Invention

The present invention relates to a textile printing technique using an ink-jet system.

2. Related Background Art

At present, textile printing is principally conducted by screen printing or roller printing. Both methods are unfit for multi-kind small-quantity production and unsuited to quickly cope with the fashion of the day. Therefore, there has recently been a demand for development of an electronic printing system making no use of any plate. In compliance with this demand, many textile printing processes according to ink-jet recording have been proposed. Various fields expect much from such textile printing processes.

As necessary conditions required for ink-jet textile printing, may be mentioned the following:

(1) being able to achieve sufficient color depth upon coloring with ink;

(2) being able to provide a print high in color yield of dye on cloth and free from staining on white areas, and to conduct waste water treatment after completion of washing with ease;

(3) causing little irregular bleeding due to color mixing between inks of different colors on cloth (4) being able to achieve color reproduction within a wide range; and (5) being able to achieve stable coloring upon fixing treatment.

In order to satisfy these requirements, it has been principally conducted to add various additives to ink or to subject cloth to pretreatment. However, such methods have failed to satisfy all the above requirements at the same time.

As an illustrative method for satisfying the requirement (3) though it is not applied to cloth, may be mentioned a method in which shot of inks is conducted in particular order of lightness, as described in Japanese Patent Application Laid-Open No. 62-161541. In the case of cloth, it is however impossible to satisfy the requirement (3) because color yields of inks making use of reactive dyes vary depending upon their reaction rates when the inks are shot on the cloth in order of initial lightness inherent in each ink.

Further, the textile printing requires a fixing process and, as a final step, a washing process in which unfixed dyes attached to cloth are removed. It is therefore necessary to handle in a manner different from that in conventional recording on the common paper so as to cope with the requirement (2) described above.

In particular, in the case of ink-jet textile printing, the amount per unit area of dyes applied to cloth is less than in conventional textile printing processes. Therefore, a delicate difference in conditions in the fixing process greatly affects coloring ability, resulting in raising many problems. For example, when an image is formed with at least two inks containing separately dyes different in reaction rate, a state that a fixed dye and an unfixed dye coexist appears in the course of the fixing process. At this time, if fixing conditions are preset on the basis of the ink containing a slow-reacting dye, bleeding becomes marked, and flushing and deterioration in level dyeing ability are caused at color-mixed portions. On the contrary, if the conditions are preset on the basis of the ink containing a fast-reacting dye, reduction in color yield, staining on white area and deterioration in color depth are caused.

In order to cope with the above problem, it is considered to conduct ink-jet textile printing with at least two inks separately containing dyes equal in reaction rate, thereby permitting the optimum presetting of fixing conditions so as not to cause the problems of color yield, coloring ability, level dyeing ability and bleeding. Actually, however, the formation of images is often conducted with at least two inks separately containing dyes different in reaction rate. With respect to the requirement (5) that stable coloring must be achieved, in particular, in the case where textile printing is conducted by an ink-jet system, there is accordingly a demand for technical improvement peculiar to its printing process.

As described above, means capable of satisfying one of the above requirements to some extent have been able to be found in the prior art. However, there has not yet been known any ink-jet printing process which can satisfy all the above-mentioned requirements at the same time, solve all the problems relating to such requirements, and stably provide images of the best quality.

In addition, the conventional processes making use of a textile size, such as screen printing and roller printing use great amounts of dyes because the color yield of the dyes is low. As a result, the outflow of the dyes in a washing process causes environmental pollution, and staining on white areas in the washing process becomes a problem awaiting solution.

SUMMARY OF THE INVENTION

It is therefore an object of the present invention to provide a printing process and an ink set which can solve such problems involved in the usual ink-jet printing, stably provide prints bright and high in color depth and definition and achieve high color yield, and processed articles obtained thereby.

Such an object can be achieved by the present invention described below.

According to the present invention, there is thus provided an ink-jet printing process comprising at least the steps of:

(a) successively applying, as ink droplets, at least two inks of different colors to a cloth to form a color-mixed portion;

(b) subjecting the cloth to a heat treatment to fix dyes contained in the inks to the cloth; and (c) washing the cloth to remove unfixed dyes from the cloth, wherein the inks comprise water, an organic solvent and individual reactive dyes different from each other in reaction rate, and the volume of a droplet of the ink containing a slower-reacting dye is made smaller upon the application of the inks.

According to the present invention, there is also provided an ink-jet printing process comprising at least the steps of:

(a) successively applying, as ink droplets, at least two inks of different colors to a cloth to form a color-mixed portion;

(b) subjecting the cloth to a heat treatment to fix dyes contained in the inks to the cloth; and (c) washing the cloth to remove unfixed dyes from the cloth, wherein the inks comprise water, an organic solvent and individual reactive dyes different from each other in reaction rate, and the dye content per droplet of the ink containing a slower-reacting dye is made lower.

According to the present invention, there is further provided an ink-jet printing process comprising at least the steps of:

(a) successively applying, as ink droplets, at least two inks of different colors to a cloth to form a color-mixed portion;

(b) subjecting the cloth to a heat treatment to fix dyes contained in the inks to the cloth; and (c) washing the cloth to remove unfixed dyes from the cloth, wherein the inks comprise water, an organic solvent and individual reactive dyes different from each other in reaction rate, and the organic solvent content per droplet of the ink containing a slower-reacting dye is made lower.

According to the present invention, there is still further provided an ink-jet printing process comprising at least the steps of:

(a) successively applying, as ink droplets, at least two inks of different colors to a cloth to form a color-mixed portion;

(b) subjecting the cloth to a heat treatment to fix dyes contained in the inks to the cloth; and (c) washing the cloth to remove unfixed dyes from the cloth, wherein the inks comprise water, an organic solvent and individual reactive dyes different from each other in reaction rate and have a pH within a range of from 4 to 10, and the pH of the ink containing a slower-reacting dye is made higher.

According to the present invention, there is yet still further provided an ink-jet printing process comprising at least the steps of:

(a) successively applying, as ink droplets, at least two inks of different colors to a cloth to form a color-mixed portion;

(b) subjecting the cloth to a heat treatment to fix dyes contained in the inks to the cloth; and (c) washing the cloth to remove unfixed dyes from the cloth, wherein the inks comprise individual reactive dyes different from each other in reaction rate and are applied to the cloth in order of reaction rate, beginning with the ink containing a slowest-reacting dye.

According to the present invention, there is yet still further provided an ink-jet printing process comprising at least the steps of:

(a) successively applying, as ink droplets, at least two inks of different colors to a cloth to form a color-mixed portion;

(b) subjecting the cloth to a heat treatment to fix dyes contained in the inks to the cloth; and (c) washing the cloth to remove unfixed dyes from the cloth, wherein the inks comprise individual reactive dyes different from each other in reaction rate, and the surface tension of the ink containing a slower-reacting dye is made lower.

According to the present invention, there is yet still further provided a print obtained by any one of the ink-jet printing processes described above.

According to the present invention, there is yet still further provided a processed article obtained by further processing the print described above.

According to the present invention, there is yet still further provided an ink set suitable for use in ink-jet textile printing, comprising yellow, magenta, cyan and black inks containing respective reactive dyes, wherein reactive dyes contained in the inks of the respective colors are different from each other in reaction rate, and the dye content in the ink containing a slower-reacting dye is lower.

According to the present invention, there is yet still further provided an ink set suitable for use in ink-jet textile printing, comprising yellow, magenta, cyan and black inks containing respective reactive dyes, wherein reactive dyes contained in the inks of the respective colors are different from each other in reaction rate, and the organic solvent content in the ink containing a slower-reacting dye is lower.

According to the present invention, there is yet still further provided an ink set suitable for use in ink-jet textile printing, comprising yellow, magenta, cyan and black inks containing respective reactive dyes, wherein reactive dyes contained in the inks of the respective colors are different from each other in reaction rate, and the pH of the ink containing a slower-reacting dye is higher.

According to the present invention, there is yet still further provided an ink set suitable for use in ink-jet textile printing, comprising yellow, magenta, cyan and black inks containing respective reactive dyes, wherein reactive dyes contained in the inks of the respective colors are different from each other in reaction rate, and the surface tension of the ink containing a slower-reacting dye is lower.

DESCRIPTION OF THE PREFERRED EMBODIMENTS

The present inventors have carried out an investigation with a view toward satisfying the above-described requirements from the viewpoint of performance in ink-jet printing process at the same time. In particular, the present inventors have conducted an investigation as to the presetting of such conditions such that the fixing of individual inks is completed at substantially the same time even if the dyes contained in the inks have different reaction rates, or the presetting of conditions such that adverse influence on image and color yield can be lessened even if the fixing is not completed at the same time.

As a result, it has been found that even if the thickness of a cloth or the construction (length, thickness, average number of twist and the like) of fibers making up the cloth varies to some extent, level dyeing ability and color yield are improved, especially bleeding at mixed portions between different colors is suppressed, regardless of such changes when any one of the following means is devised to the ink containing a reactive dye lower in reaction rate:

(1) the volume of a droplet of the ink being made smaller;

(2) the dye content per droplet being made lower;

(3) the organic solvent content per droplet being made lower;

(4) the pH of the ink being higher within a range of from 4 to 10;

(5) the ink being applied earlier to a cloth; and (6) the surface tension of the ink being made lower. It has also been found that even if fixing conditions vary to some extent, coloring ability does not differ much, so that prints can be obtained stably. This means that the influence of difference in reaction rate between the reactive dyes contained in the individual inks, said difference being the main reason that the above-described requirements are not satisfied by the conventional printing processes, is eliminated.

Cloths used in the present invention preferably comprise principally cellulose fibers and/or polyamide fibers at least containing an alkaline substance. No particular limitation is imposed on the production process for such cloths. However, the cloths described in Japanese Patent Application Laid-Open No. 63-168382 and Japanese Patent Publication No. 3-46589 may preferably be used.

Viewed from physical features of fibers and yarn making up a cloth, those long in fiber length, thin in thickness of the yarn and fibers and great in number of twist are suitable for use in the present invention. For example, a cloth formed from fibers having an average length of 25 to 60 mm, an average thickness of 0.6 to 2.2 deniers and an average number of twist of 70/cm to 150/cm is preferred in the case of cloth composed mainly of cellulose fibers, and a cloth formed from silk yarn having an average thickness of 14 to 147 deniers composed of fibers having an average thickness of 2.5 to 3.5 deniers in the case of cloth composed mainly of silk fibers or polyamide fibers.

Any pretreatment routinely used may be subjected on the cloths used in the present invention as needed. In particular, textile printing may preferably be conducted on cloths containing 0.01 to 5% by weight of at least one alkaline substance or 0.01 to 20% by weight of at least one substance selected from the group consisting of water-soluble metal salts, water-soluble polymers, urea and thiourea in some cases.

Examples of the alkaline substance to be added include alkali metal hydroxides such as sodium hydroxide and potassium hydroxide; amines such as mono-, di- and triethanolamines; alkali metal carbonates and bicarbonates such as sodium carbonate, potassium carbonate and sodium bicarbonate; metal salts of organic acids such as calcium acetate and barium acetate; ammonia and ammonium compounds; etc. Further, sodium trichloroacetate and the like, which form an alkaline substance by steaming or under dry heat, may also be used. Sodium carbonate and sodium bicarbonate are alkaline substances particularly suitable for use in dyeing of reactive dyes.

Examples of the water-soluble polymers include natural water-soluble polymers and synthetic water-soluble polymers. Examples of the natural water-soluble polymers include starches from corn, wheat and the like; cellulosics such as carboxymethyl cellulose, methyl cellulose and hydroxyethyl cellulose; polysaccharides such as sodium alginate, gum arabic, locust bean gum, tragacanth gum, guar gum and tamarind seed; proteins such as gelatin and casein; tannin and derivatives thereof, and lignin and derivatives thereof. Examples of synthetic water-soluble polymers include polyvinyl alcohol type compounds, polyethylene oxide type compounds, acrylic polymers, maleic anhydride polymers and the like. Of these, the polysaccharide polymers and cellulosic polymers are preferred.

Examples of the water-soluble metal salts include compounds such as halides of alkali metals and alkaline earth metals, which form typical ionic crystals and an aqueous solution which has a pH of 4 to 10. Representative examples of such compounds include NaCl, $Na_2SO_4$, KCl and $CH_3COONa$ for alkali metals, and $CaCl_2$ and $MgCl_{12}$ for alkaline earth metals. Of these, salts of Na, K and Ca are preferred.

Further, the water content in the cloth also greatly affects textile printing. The water content in the cloth may preferably be adjusted to a 5 to 100 percent raise, more preferably a 6 to 80 percent raise of the official moisture regain (for example, cellulose fiber: 8.5%, silk fiber: 12%).

A process in which a cloth is immersed in purified water or an aqueous solution of one of the pretreating agents described above and then squeezed by rollers, and optionally dried is generally used as a method of adjusting the water content, to which, however, the invention is not limited. The water content is determined in accordance with the following equation:

$$\text{Water content (\%)}=\{(W-W')/W''\}\times 100$$

wherein W is a weight of a sample before drying, W' is a weight of the sample after drying, and W" is a weight of the sample after water washing and absolute drying.

The inks used in the present invention comprise a reactive dye, water, an organic solvent and the like.

Inks separately containing dyes having different reactive groups from each other may be used in combination to form an image. As a general standard for reaction rate in the case where the inks separately containing the dyes different in reactive group are used in combination, come trichloropyridine, monochlorotriazine, vinylsulfone (sulfone amide type), monochloromethoxytriazine, difluoromonochloropyrimidine, vinylsulfone (sulfone type), methylsulfonylmethylchloropyrimidine, dichloroquinoxaline and dichlorotriazine in increasing order of the reaction rates of the reactive groups.

On the other hand, in the case where inks separately containing dyes having the same reactive group as each other are used in combination to form an image, the order of reaction rate is determined on the basis of the rate of hydrolysis in aqueous solutions of the dyes. For example, in the case of a monochlorotriazine, the determination of rank order of the rate of hydrolysis can be conducted with ease by heating an aqueous solution to 40° to 60° C. and determining the amount of chloride ion generated for a predetermined period of time by a measuring means such as ion chromatography or ion meter.

When dyes having the same reactive group are used in combination, a group consisting of dyes having a monochlorotriazine group and/or a vinylsulfone group may preferably be used. The reason why these two reactive groups are preferred is that both reactive groups are excellent in overall strength of reactivity from the viewpoint of balance taking into consideration a system intended for the present invention. If inks are made up of, for example, only a group consisting of dyes having a dichlorotriazine group high in reactivity or dyes having a trichloropyrimidine group low in reactivity, the effects of the present invention cannot be very well exhibited.

Specific examples of dyes suitable for use in the inks useful in the practice of the present invention include those typified by C.I. Reactive Yellow 2, 15, 37, 42, 76 and 95, C.I. Reactive Red 21, 22, 24, 31, 33, 45, 58, 111, 112, 114, 180, 218 and 226, C.I. Reactive Blue 15, 19, 21, 38, 49, 72, 77, 176, 203 and 220, C.I. Reactive Orange 5, 12, 13 and 35, C.I. Reactive Brown 7, 11, 33 and 46, C.I. Reactive Green 8 and 19, C.I. Reactive Violet 2, 6 and 22, and C.I. Reactive Black 5, 8, 31 and 39, to which, however, are not limited.

These dyes may be contained in each ink either singly or in any combination with dyes of the same or different hues. The total amount of the dyes to be used is generally within a range of from 2 to 30% by weight, preferably from 3 to 25% by weight, more preferably from 4 to 20% by weight based on the total weight of the ink. The rank order of reaction rate where plural dyes are used in combination is determined on the basis of the reaction rate of a dye contained in the greatest amount.

In the case where a discrimination is made in the dye content per ink droplet, the weight of a slower-reacting dye in an ink containing such a dye is controlled to 95 or less, preferably 90 or less, assuming the weight of a faster-reacting dye in another ink containing such a dye is 100.

Water which is suitable for a main component of the inks is used within a range of from 10 to 93% by weight, preferably from 25 to 87% by weight, more preferably from 30 to 80% by weight based on the total weight of the ink.

Examples of the organic solvent include ketones and keto-alcohols such as acetone and diacetone alcohol; ethers such as tetrahydrofuran and dioxane; addition polymers of oxyethylene or oxypropylene such as diethylene glycol, triethylene glycol, tetraethylene glycol, dipropylene glycol, tripropylene glycol, polyethylene glycol, polypropylene glycol and the like; alkylene glycols the alkylene moiety of which has 2 to 6 carbon atoms, such as ethylene glycol, propylene glycol, trimethylene glycol, butylene glycol and hexylene glycol; triols such as 1,2,6-hexanetriol and glycerol; thiodiglycol; lower alkyl ethers of polyhydric alcohols, such as ethylene glycol monomethyl (or monoethyl) ether, diethylene glycol monomethyl (or monoethyl) ether and triethylene glycol monomethyl (or monoethyl) ether; lower dialkyl ethers of polyhydric alcohols, such as triethylene glycol dimethyl (or diethyl) ether and tetraethylene glycol dimethyl (or diethyl) ether; sulfolane; N-methyl-2-pyrrolidone; 1,3-dimethyl-2-imidazolidinone; and the like.

The content of the organic solvent as described above is generally within a range of from 3 to 60% by weight, preferably from 5 to 50% by weight based on the total weight of the ink.

The liquid medium components as described above may be used either singly or in any combination thereof if used in combination with water. However, a preferable composition of the liquid medium comprises a solvent having a vapor pressure of 0.1 mmHg or lower (at 20° C.). Examples of such solvents include thiodiglycol, polymers of oxyethylene or oxypropylene, which have a polymerization degree of 2 to 4, and mono- or dialkyl ethers of the polymers. Among others, a single solvent of thiodiglycol or a mixed solvent system of diethylene glycol and thiodiglycol is particularly preferred.

In the case where a discrimination is made in the organic solvent content per ink droplet, the total weight of the solvents contained in a droplet of an ink containing a slower-reacting dye is controlled to 95 or less, preferably 90 or less supposing the total weight of the solvents contained in a droplet of another ink containing a faster-reacting dye is 100.

With respect to other components which may be contained, if an ink contains, for example, 0.001 to 0.15% by weight of chloride ion and/or sulfate ion, its coloring properties such as level dyeing ability and color yield are improved.

A method of making an ink suitable by the adjustment of physical properties includes pH adjustment. The method comprises making the pH of an ink containing a slower-reacting dye higher within a range of from 4 to 10. More specifically, when equal amounts of droplets of inks of a single color are separately applied to a cloth, the pH of the ink in which the slope of a curve as to heat treatment time at a fixed temperature versus fixing rate is gentler is made higher. Namely, the inks are arranged in order of the reaction rate of dyes contained in the inks to render a difference in pH between adjacent inks 0.5 or more, preferably 1.0 or more. Preferable examples of pH adjustors for the inks include alkali metal hydroxides such as NaOH and LiOH; alkali metal salts such as $Na_2CO_3$ and $NaHCO_3$; inorganic acids and salts of inorganic acids, such as HCl, $Na_2SO_4$ and $Na_3PO_4$; and organic acids having at least one carboxyl group, such as acetic acid, maleic acid, succinic acid and citric acid, to which, however, the invention are not limited.

In the present invention, another method of making an ink suitable by the adjustment of physical properties includes a means in which the surface tension of an ink containing a slower-reacting dye is made lower. More specifically, when equal amounts of droplets of inks of a single color are separately applied to a cloth, the surface tension of the ink in which the slope of a curve as to heat treatment time at a fixed temperature versus fixing rate is gentler, is made lower. Specifically, the inks are arranged in order of the reaction rate of their dyes to render a difference in surface tension between adjacent inks of 3 dyn/cm or more, preferably 5 dyn/cm or more. As surface tension modifiers for the inks, may be used known surface tension modifiers such as variety of cationic or nonionic surfactants; amines such as diethanolamine and triethanolamine; and alcohols such as ethanol and isopropyl alcohol.

The principal components of the inks according to the present invention are as described above. However, as other ingredients for the aqueous liquid medium, may be added various kinds of dispersants, surfactants, viscosity modifiers, surface tension modifiers, optical whitening agents and the like as needed.

Specific examples thereof include viscosity modifiers such as polyvinyl alcohol, cellulosics and water-soluble resins; various kinds of anionic or nonionic surfactants; surface tension modifiers such as diethanolamine and triethanolamine; mildewproofing agents; and the like.

No particular limitation is imposed on the ink-jet recording system used for applying the inks according to the present invention to a cloth. However, a system in which an ink is ejected as ink droplets by the action of thermal energy, i.e., a bubble jet system, is the most effective method because the impact velocity of a droplet is about 5 to 20 m/sec, and so the initial penetration speed of ink into the cloth and degree of bounce of ink fall within a range in which the effects of the present invention are markedly exhibited.

In the case where a droplet of an ink containing a slower-reacting dye is made smaller, the volume of the droplet of the ink containing the slower-reacting dye is controlled to 95 or less, preferably 90 or less supposing the volume of a droplet of another ink containing a faster-reacting dye is 100.

In the present invention, droplets of plural inks are applied to the above-described cloth by an ink-jet system to form an image with at least two inks of different colors. At this time, the total amount per unit area of individual dyes applied in a color-mixed portion formed is preferably within a range of from 0.025 to 1 $mg/cm^2$, more preferably from 0.04 to 0.7 $mg/cm^2$, most preferably from 0.05 to 0.5 $mg/cm^2$. This amount can be determined by measuring the amount of the inks ejected and the concentration of the dyes in the inks. If the amount of the dyes applied is less than 0.025 $mg/cm^2$, coloring at high color depth is difficult to achieve, and bleeding is also hard to become striking. Therefore, the effects of the present invention are made unclear. If the amount of the dyes applied is more than 1 $mg/cm^2$, an effect of improving color yield may not be markedly recognized in some cases.

The inks according to the present invention are applied onto a cloth in the above-described manner. However, the inks only-adhere to the cloth in this state. Accordingly, the cloth must be subsequently subjected to a process for reactively fixing the dyes in the inks to the fibers and a process for removing unfixed dyes. Such reactive fixing and removal of the unreacted dyes may be conducted in accordance with any conventionally known method. For example, the recorded cloth may be treated by a steaming process, an HT steaming process or a thermofix process, or in the case where no alkali-treated cloth is used, an alkaline pad-steam process, an alkaline blotch-steam process, an alkaline shock process or an alkaline cold fix process. In particular, the steaming process and the HT steaming process are preferred because the effects of the present invention can be even more enhanced. Subsequent washing may be conducted in accordance with a method known per se in the art.

The cloth subjected to the above-described treatments is then cut into desired sizes, and the cut pieces are subjected to processes required to obtain final processed articles, such as sewing, bonding and/or welding, thereby obtaining apparel such as one-piecers, dresses, neckties or bathing suits, bed covers, sofa covers, handkerchiefs, curtains, or the like. Methods in which a cloth is processed by sewing and/or the like to obtain apparel or other daily needs are described in many known books, for example, "Saishin Nitto Hosei Manual (The Newest Knitting and Sewing Manual)", published by Seni Journal Co.; a monthly magazine, "Soen", published by Bunka Shuppan Kyoku; etc.

According to the present invention, when the inks separately containing dyes different from each other in reaction rate are used to form a color-mixed portion, the volumes of droplets of the inks, the contents of the dyes and organic solvents in the droplets, the pH of the inks, the order of application of droplets or the surface tensions of the inks are controlled, whereby the fixing speeds of the inks on the cloth are made substantially equal to one another. Therefore, good ink-jet textile printing wherein a bright image can be provided, little irregular bleeding occurs at a color-mixed portion, and color reproduction can be achieved within a wide range, can be stably conducted. It goes without saying that when the above-described conditions are combined at the same time, the effects of the present invention may be even more enhanced in some cases.

Incidentally, the fixing rate is determined on the basis of color depth. The measurement of the color depth may be conducted by means of a common colorimeter. The present inventors conducted colorimetry by a high speed spectrophotometer "CA-35" (manufactured by Murakami Shikisai Gijutsu Kenkyusho), thereby determining a color depth value, K/S, from a reflectance R at a maximum absorption wavelength in a finally dyed portion in accordance with the following equation:

$$K/S=(1\times R)^2/2\times R$$

(R: reflectance at a maximum absorption wavelength).

EXAMPLES

The present invention will hereinafter be described specifically by the following Examples and Comparative Examples. Incidentally, all designations of "part" or "parts" and "%" as will be used in the following examples mean part or parts by weight and % by weight unless expressly noted.

I. Preparation of ink:

Sets of each 4 inks of different colors, which will be described subsequently, were prepared.

(1) Group A of reactive dye inks:

| | |
|---|---|
| Reactive dye | X parts |
| Thiodiglycol | 24 parts |
| Diethylene glycol | 12 parts |
| Potassium chloride | 0.004 part |
| Sodium sulfate | 0.002 part |
| Sodium metasilicate | 0.001 part |
| Iron chloride | 0.0005 part |
| Water | 64 − X parts. |

Dyes used are as follows:

Yellow ink:

C.I. Reactive Yellow 95 (monochlorotriazine type)

Magenta ink:

C.I. Reactive Red 226 (monochlorotriazine type)

Cyan ink:

C.I. Reactive Blue 15 (monochlorotriazine type)

Black ink:

C.I. Reactive Black 39 (monochlorotriazine type).

The rank order of reaction rate of the dyes used are as follows:

Magenta>Black>Yellow>Cyan.

X in each of the above respective compositions was adjusted to 10 to mix the components. After the resultant mixtures were adjusted to pH 7.0 with sodium hydroxide and stirred for 2 hours, they were filtered through a "Fluoropore Filter FP-100" (trade name; product of Sumitomo Electric Industries, Ltd.), thereby obtaining water-based inks to be used in Examples 1 and 2, and Comparative Examples 1 and 2.

(2) Group B of reactive dye inks:

Water-based inks to be used in Examples 3 and 4, and Comparative Examples 3 and 4 were prepared in the same manner as in Group A except that X in each of the ink compositions in Group A was adjusted within a range of from 7 to 10.

(3) Group C of reactive dye inks:

| | |
|---|---|
| Reactive dye | 5 parts |
| Thiodiglycol | Y parts |
| Diethylene glycol | 2 parts |
| Dipropylene glycol | 2 parts |
| Potassium chloride | 0.05 part |
| Sodium metasilicate | 0.001 part |
| Iron chloride | 0.0005 part |
| Zinc chloride | 0.0003 part |
| Water | 91 − Y parts. |

Dyes used are as follows:

Yellow ink:

C.I. Reactive Yellow 25 (difluoromonochloropyrimidine type)

Magenta ink:

C.I. Reactive Red 24 (monochlorotriazine type)

Cyan ink:

C.I. Reactive Blue 52 (trichloropyrimidine type)

Black ink:

C.I. Reactive Black 5 (vinylsulfone type (sulfone type)).

The rank order of reaction rate of the dyes used are as follows:

Black>Yellow>Magenta>Cyan.

Y in each of the above respective compositions was adjusted to 32 to mix the components. After the mixtures were adjusted to a pH within a range of from 6 to 9 with sodium hydroxide and/or acetic acid and stirred for 2 hours, they were filtered through a "Fluoropore Filter FP-100" (trade name; product of Sumitomo Electric Industries, Ltd.), thereby obtaining water-based inks used in Examples 5 and 6, and Comparative Examples 5 and 6.

(4) Group D of reactive dye inks:

Water-based inks to be used in Examples 7 and 8, and Comparative Examples 7 and 8 were prepared in the same manner as in Group C except that Y in each of the ink compositions in Group C was adjusted within a range of from 23 to 32, and the mixtures were adjusted to pH 5.0 with succinic acid.

II. Ink-jet printing apparatus: A "Color Bubble Jet Copier PIXEL PRO" (trade name, manufactured by Canon Inc.) of the following specifications, which makes use of thermal energy, was used.

1. Ink-jet system: On-Demand type (bubble jet system)
2. Head voltage: 24 V

3. Head temperature: 35° to 50° C.
4. Drive pulse length: 10 μs
5. Drive frequency: 2.5 kHz
6. Distance between nozzle and woven fabric: 1 mm
7. Recording density: 16 dots/mm×16 dots/mm (400 dots/inch×400 dots/inch).

III. Cloth:

The following two woven fabrics were used.

a: Plain weave fabric (100% of Egyptian cotton; treated with a solution composed of 5% of sodium bicarbonate, 5% of urea and 90% of water, and then dried at a pickup of 30%; final water content: 15%); and b: Habutae with 8 momme (100% of silk; treated with a solution composed of 3% of sodium bicarbonate, 8% of urea and 89% of water, and then dried at a pickup of 30%; final water content: 18%).

Examples 1 and 2, and Comparative Examples 1 and 2

Using the four reactive dye inks of the different colors in Group A and the cloths a and b, printing was conducted by means of the above described ink-jet printing apparatus while changing the volumes of droplets of the inks as shown in Table 1 and controlling the temperature of heads. Thereafter, the resulting print samples were subjecting to a steaming treatment at 102° C. for 6 or 8 minutes, washed and dried. The print samples were evaluated in level dyeing ability, bleeding tendency and coloring ability. As a result, it was found that when the volume of the droplet of the ink containing the slower-reacting dye was made smaller, bleeding at color-mixed portions was suppressed to a significant extent to provide very bright images, and color yield judged by the relative evaluation of the K/S values was also good.

TABLE 1

| | Cloth | Volume of*1 droplet of each ink | Level*2 dyeing ability | Bleeding*3 tendency | Coloring*4 ability |
|---|---|---|---|---|---|
| Ex. 1 | a | A | G | G | G |
| Ex. 2 | b | A | G | G | G |
| Comp. Ex. 1 | a | B | P | P | P |
| Comp. Ex. 1 | b | C | F | P | P |

G: Good, F: Fair, P: Poor.

*1: Volume of a droplet of each ink (pl)
A = Cyan: 26, Yellow: 28, Black: 30, Magenta: 32
B = Cyan: 32, Yellow: 30, Black: 28, Magenta: 26
C = Cyan: 30, Yellow: 32, Black: 26, Magenta: 28.

*2: Print irregularity at color-mixed portions (all the six combinations of the four inks) in areas having printing densities of 50% and 100% in a single ink was observed by naked eyes to synthetically evaluate the level dyeing ability in terms of the sharpness of patterns in accordance with the following standard:
G: No substantial irregularity;
F: Irregularity was somewhat observed by some combinations in the 100% area;
P: Irregularity was considerably observed in both 50% and 100% areas.

*3: Exudation of dyes at boundaries of two-colored-mixed portions (all the six combinations of the four inks) in the area having a printing density of 100% in a single ink was observed by naked eyes to synthetically evaluate the bleeding tendency in accordance with the following standard:
G: No substantial exudation;
F: Exudation was observed by some combinations;
P: Exudation was markedly observed.

*4: K/S values of print samples subjected to the steaming treatments for 6 minutes and 8 minutes, respectively, were measured to evaluate the coloring ability in terms of the remainder thereof in accordance with the following standard:
G: The remainder of K/S values was smaller than 1, which meant that the coloring ability does not vary greatly depending upon the heating conditions;
F: The remainder of K/S values was 1 to 2, which meant that the coloring ability varies somewhat depending upon the heating conditions;
P: The remainder of K/S values was greater than 2, which meant that the coloring ability varies considerably depending upon the heating conditions.

Examples 3 and 4, and Comparative Examples 3 and 4

Using the four reactive dye inks of the different colors in-Group B and the cloths a and b, printing was conducted by means of the above described ink-jet printing apparatus in the same manner as in Examples and Comparative Examples shown in Table 1 except that the ejection volumes of droplets were unified to 30 pl and the contents of the dyes in the inks were changed as shown in Table 2. Thereafter, the resulting print samples were subjecting to a steaming treatment at 102° C. for 6 or 8 minutes, washed and dried. The print samples were evaluated in level dyeing ability, bleeding tendency and coloring ability. The results are shown in Table 2. As a result, it was found that when the dye content of the ink containing the slower-reacting dye was made smaller, bleeding at color-mixed portions was suppressed to a significant extent to provide very bright images, and color yield judged by the relative evaluation of the K/S values was also good.

TABLE 2

| | Cloth | Content*5 of dye in each ink | Level*2 dyeing ability | Bleeding*3 tendency | Coloring*4 ability |
|---|---|---|---|---|---|
| Ex. 3 | a | A | G | G | G |
| Ex. 4 | b | A | G | G | G |
| Comp. Ex. 3 | a | B | P | P | P |
| Comp. Ex. 4 | b | C | F | P | P |

*2 to *4: The same meanings as those in Table 1, respectively.

*5: Content of dye in each ink (parts by weight)
A = Cyan: 7, Yellow: 8, Black: 9, Magenta: 10
B = Cyan: 10, Yellow: 9, Black: 8, Magenta: 7
C = Cyan: 9, Yellow: 10, Black: 7, Magenta: 8.

Examples 5 and 6, and Comparative Examples 5 and 6

Using the four reactive dye inks of the different colors in Group C and the cloths a and b, printing was conducted by means of the above described ink-jet printing apparatus in the same manner as in Examples and Comparative Examples shown in Table 2 except that the pHs of the inks were changed as shown in Table 3. Thereafter, the resulting print samples were subjecting to a steaming treatment at 102° C. for 6 or 8 minutes, washed and dried. The print samples were evaluated in level dyeing ability, bleeding tendency and coloring ability. The results are shown in Table 3. As a result, it was found that when the pH of the ink containing the slower-reacting dye was made higher, bleeding at color-mixed portions was suppressed to a significant extent to provide very bright images, and color yield judged by the relative evaluation of the K/S values was also good.

TABLE 3

| | Cloth | pH of*[6] each ink | Level*[2] dyeing ability | Bleeding*[3] tendency | Coloring*[4] ability |
|---|---|---|---|---|---|
| Ex. 5 | a | A | G | G | G |
| Ex. 6 | b | A | G | G | G |
| Comp. Ex. 5 | a | B | P | P | P |
| Comp. Ex. 6 | b | C | F | P | P |

*[2] to *[4]: The same meanings as those in Table 1, respectively.
*[6]: pH of each ink
A = Cyan: 9, Magenta: 8, Yellow: 7, Black: 6
B = Cyan: 6, Magenta: 7, Yellow: 8, Black: 9
C = Cyan: 8, Magenta: 9, Yellow: 6, Black: 7.

Examples 7 and 8, and Comparative Examples 7 and 8

Using the four reactive dye inks of the different colors in Group D and the cloths a and b, printing was conducted by means of the above described ink-jet printing apparatus in the same manner as in the Examples and Comparative Examples shown in Table 2 except that the contents of thiodiglycol in the inks were changed as shown in Table 4. Thereafter, the resulting print samples were subjecting to a steaming treatment at 102° C. for 6 or 8 minutes, washed and dried. The print samples were evaluated in level dyeing ability, bleeding tendency and coloring ability. The results are shown in Table 4. As a result, it was found that when the content of the solvent in the ink containing the-slower-reacting dye was made lower, bleeding at color-mixed portions was suppressed to a significant extent to provide very bright images, and color yield judged by the relative evaluation of the K/S values was also good.

TABLE 4

| | Cloth | Content of*[7] solvent in each ink | Level*[2] dyeing ability | Bleeding*[3] tendency | Coloring*[4] ability |
|---|---|---|---|---|---|
| Ex. 7 | a | A | G | G | G |
| Ex. 8 | b | A | G | G | G |
| Comp. Ex. 7 | a | B | P | P | P |
| Comp. Ex. 8 | b | C | F | P | P |

*[2] to *[4]: The same meanings as those in Table 1, respectively.
*[6]: Content of thiodiglycol in each ink (parts by weight)
A = Cyan: 23, Magenta: 26, Yellow: 29, Black: 32
B = Cyan: 32, Magenta: 29, Yellow: 26, Black: 23
C = Cyan: 29, Magenta: 32, Yellow: 23, Black: 26.

IV. Preparation of ink:

Sets of each 4 inks of different colors, which will be described subsequently, were prepared.

(5) Reactive dye inks:

| | |
|---|---|
| Reactive dye | 10 parts |
| Thiodiglycol | 24 parts |
| Diethylene glycol | 11 parts |
| Potassium chloride | 0.004 part |
| Sodium sulfate | 0.002 part |
| Sodium metasilicate | 0.001 part |
| Iron chloride | 0.0005 part |
| Water | 55 parts. |

Dyes used are the same as those used in Examples 1 and 2.

The rank order of reaction rate of the dyes used are as follows:

Magenta>Black>Yellow>Cyan.

The above respective components were mixed, and the mixtures were adjusted to pH 7.0 with sodium hydroxide and stirred for 2 hours. Thereafter, they were filtered through a "Fluoropore Filter FP-100" (trade name; product of Sumitomo Electric Industries, Ltd.), thereby obtaining water-based inks to be used in Examples 9 and 10, and Comparative Examples 9 and 10.

| | |
|---|---|
| Reactive dye | 10 parts |
| Thiodiglycol | 23 parts |
| Triethylene glycol monomethyl ether | 6 parts |
| Potassium chloride | 0.05 part |
| Sodium metasilicate | 0.0001 part |
| Iron chloride | 0.0005 part |
| Zinc chloride | 0.0003 part |
| Water | 61 parts. |

Dyes used are the same as those used in Examples 5 and 6.

The rank order of reaction rate of the dyes used are as follows:

Black>Yellow>Magenta>Cyan.

The above respective components were mixed, and the surface tensions of the resultant mixtures were adjusted within a range of from 55 to 35 dyn/cm with isopropyl alcohol. Thereafter, the mixtures were adjusted to pH 7.0 with sodium hydroxide, stirred for 2 hours, and then filtered through a "Fluoropore Filter FP-100" (trade name; product of Sumitomo Electric Industries, Ltd.), thereby obtaining water-based inks to be used in Examples 11 and 12, and Comparative Examples 11 and 12.

V. Ink-jet printing apparatus:

A "Color Bubble Jet Copier PIXEL PRO" (trade name, manufactured by Canon Inc.) of the following specifications, which makes use of thermal energy, was used.

1. Ink-jet system: On-Demand type (bubble jet system)
2. Head voltage: 24 V
3. Head temperature: 35° C.
4. Drive pulse length: 10 μs
5. Drive frequency: 2.5 kHz
6. Distance between nozzle and woven fabric: 1 mm
7. Recording density: 16 dots/mm×16 dots/mm (400 dots/inch×400 dots/inch).

VI. Cloth:

The same woven fabrics as those used in Examples 1 and 2 were used.

Examples 9 and 10, and Comparative Examples 9 and 10

Using the four reactive dye inks prepared in (5) and the cloths a and b, printing was conducted by means of the above described ink-jet printing apparatus while changing the shot order of the inks as shown in Table 5. Thereafter, the resulting print samples were subjecting to a steaming treatment at 102° C. for 6 or 8 minutes, washed and dried. The print samples were evaluated in level dyeing ability, bleeding tendency and coloring ability. As a result, it was found that when the inks were shot in order of reaction rate, beginning with the ink containing a slowest-reacting dye, bleeding at color-mixed portions was suppressed to a significant extent to provide very bright images, and color yield judged by the relative evaluation of the K/S values was also good.

TABLE 5

| | Cloth | Order*1 of shot | Level*2 dyeing ability | Bleeding*3 tendency | Coloring*4 ability |
|---|---|---|---|---|---|
| Ex. 9 | a | A | G | G | G |
| Ex. 10 | b | A | G | G | G |
| Comp. Ex. 9 | a | B | P | P | P |
| Comp. Ex. 10 | b | C | F | P | P |

*1: The rank order of reaction rate of the dyes used are as follows:
Cyan < Yellow < Black < Magenta.
Order of shot:
A = 1 Cyan, 2 Yellow, 3 Black, 4 Magenta
B = 1 Magenta, 2 Black, 3 Yellow, 4 Cyan
C = 1 Yellow, 2 Cyan, 3 Magenta, 4 Black.
*2 to *4: The same meanings as those in Table 1, respectively.

Examples 11 and 12, and Comparative Examples 11 and 12

Using the four reactive dye inks prepared in (6) and the cloths a and b, printing was conducted by means of the above described ink-jet printing apparatus while keeping the inks varied surface tensions by controlling the amount of isopropyl alcohol added as shown in Table 6. Thereafter, the resulting print samples were subjecting to a steaming treatment at 102° C. for 6 or 8 minutes, washed and dried. The print samples were evaluated in level dyeing ability, bleeding tendency and coloring ability. The results are shown in Table 6. As a result, it was found that when the surface tension of the ink containing a slower-reacting dye was made lower, bleeding at color-mixed portions was suppressed to a significant extent to provide very bright images, and color yield judged by the relative evaluation of the K/S values was also good.

TABLE 6

| | Cloth | Surface*5 tension of each ink | Level*2 dyeing ability | Bleeding*3 tendency | Coloring*4 ability |
|---|---|---|---|---|---|
| Ex. 11 | a | A | G | G | G |
| Ex. 12 | b | A | G | G | G |
| Comp. Ex. 11 | a | B | P | P | P |
| Comp. Ex. 12 | b | C | F | P | P |

*2 to *4: The same meanings as those in Table 1, respectively.
*5: The rank order of reaction rate of the dyes used are as follows:
Cyan < Magenta < Yellow < Black.
Surface tension of each ink (dyn/cm):
A = Cyan: 35, Magenta: 45, Yellow: 50, Black: 55
B = Cyan: 55, Magenta: 50, Yellow: 40, Black: 35
C = Cyan: 45, Magenta: 40, Yellow: 55, Black: 35.

According to the ink-jet printing processes of the present invention, prints free of any bleeding, bright, and high in color depth and definition can be stably provided. Further, color yield upon printing is improved to a significant extent, and so the problem of environmental pollution by waste water can be lessened.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink-jet printing process comprising at least the steps of:

(a) successively applying, as ink droplets, at least four inks of different colors to a cloth to form an image;

(b) subjecting the cloth to a heat treatment to fix dyes contained in the inks to the cloth; and (c) washing the cloth to remove unfixed dyes from the cloth, wherein the inks comprise water, an organic solvent and individual reactive dyes different from one another in reaction rate, and the volume of a droplet of the ink containing a slower-reacting dye is made smaller upon the application of the inks.

2. An ink-jet printing process comprising at least the steps of:

(a) successively applying, as ink droplets, at least four inks of different colors to a cloth to form an image;

(b) subjecting the cloth to a heat treatment to fix dyes contained in the inks to the cloth; and (c) washing the cloth to remove unfixed dyes from the cloth, wherein the inks comprise water, an organic solvent and individual reactive dyes different from one another in reaction rate, and the dye content per droplet of the ink containing a slower-reacting dye is made lower.

3. An ink-jet printing process comprising at least the steps of:

(a) successively applying, as ink droplets, at least four inks of different colors to a cloth to form an image;

(b) subjecting the cloth to a heat treatment to fix dyes contained in the inks to the cloth; and (c) washing the cloth to remove unfixed dyes from the cloth, wherein the inks comprise water, an organic solvent and individual reactive dyes different from one another in reaction rate, and the organic solvent content per droplet of the ink containing a slower-reacting dye is made lower.

4. An ink-jet printing process comprising at least the steps of:

(a) successively applying, as ink droplets, at least four inks of different colors to a cloth to form an image;

(b) subjecting the cloth to a heat treatment to fix dyes contained in the inks to the cloth; and (c) washing the cloth to remove unfixed dyes from the cloth, wherein the inks comprise water, an organic solvent and individual reactive dyes different from one another in reaction rate and have a pH within a range of from 4 to 10, and the pH of the ink containing a slower-reacting dye is made higher, and a difference between the pH's of adjacent inks is not less than 0.5.

5. The ink-jet printing process according to any one of claims 1 to 4, wherein the total amount of individual reactive dyes applied to form the image is within a range of from 0.025 to 1 mg/cm$^2$.

6. The ink-jet printing process according to any one of claims 1 to 4, wherein the cloth is a cloth comprising cellulose fibers or polyamide fibers.

7. The ink-jet printing process according to any one of claims 1 to 4, wherein the reactive dyes are reactive dyes having a monochlorotriazine group or a vinylsulfone group.

8. The ink-jet printing process according to any one of claims 1 to 4, wherein the cloth is subjected to a pretreatment comprising applying an alkaline substance or a substance selected from the group consisting of water-soluble metal salts, water-soluble polymers, urea and thiourea to the cloth prior to the step (a).

9. The ink-jet printing process according to claim 1, wherein the volume of the droplet of one ink containing a slower-reacting dye between adjacent inks is adjusted to not more than 95% of the volume of a droplet of an ink containing a faster-reacting dye.

10. The ink-jet printing process according to claim 2, wherein the weight of a slower-reacting dye in one ink containing such a dye between adjacent inks is adjusted to not more than 95% of the weight of a faster-reacting dye in an ink containing such a dye.

11. The ink-jet printing process according to claim 3, wherein the total weight of solvents contained in one ink containing a slower-reacting dye between adjacent inks is adjusted to not more than 95% of the weight of solvents contained in an ink containing a faster-reacting dye.

12. A print obtained by the ink-jet printing process according to any one of claims 1 to 4.

13. A processed article obtained by further processing the print according to claim 12.

14. The processed article according to claim 13, which is obtained by cutting the printed cloth into desired sizes, and then subjecting each of the cut pieces to processes required to obtain a final processed article.

15. The processed article according to claim 14, wherein a process required to obtain the final processed article is sewing.

16. The processed article according to claim 13, wherein the processed article is apparel.

17. The processed article according to claim 14, wherein the processed article is apparel.

18. The processed article according to claim 15, wherein the processed article is apparel.

19. An ink-jet printing process comprising at least the steps of:

(a) successively applying, as ink droplets, at least four inks of different colors to a cloth to form an image;

(b) subjecting the cloth to a heat treatment to fix dyes contained in the inks to the cloth; and (c) washing the cloth to remove unfixed dyes from the cloth, wherein the inks comprise individual reactive dyes different from one another in reaction rate and are applied to the cloth in order of reaction rate, beginning with the ink containing a slowest-reacting dye.

20. An ink-jet printing process comprising at least the steps of:

(a) successively applying, as ink droplets, at least four inks of different colors to a cloth to form an image;

(b) subjecting the cloth to a heat treatment to fix dyes contained in the inks to the cloth; and (c) washing the cloth to remove unfixed dyes from the cloth, wherein the inks comprise individual reactive dyes different from one another in reaction rate, and the surface tension of the ink containing a slower-reacting dye is made lower.

21. The ink-jet printing process according to claim 19 or 20, wherein the total amount of individual reactive dyes applied to form the image is within a range of from 0.025 to 1 $mg/cm^2$.

22. The ink-jet printing process according to claim 19 or 20, wherein the cloth is a cloth comprising cellulose fibers or polyamide fibers.

23. The ink-jet printing process according to claim 19 or 20, wherein the reactive dyes are reactive dyes having a monochlorotriazine group or a vinylsulfone group.

24. The ink-jet printing process according to claim 19 or 20, wherein the cloth is subjected to a pretreatment comprising applying an alkaline substance or a substance selected from the group consisting of water-soluble metal salts, water-soluble polymers, urea and thiourea to the cloth prior to the step (a).

25. The ink-jet printing process according to claim 19 or 20, wherein a difference in surface tension between adjacent inks is 3 dyn/cm or more.

26. A print obtained by the ink-jet printing process according to claim 19.

27. A print obtained by the ink-jet printing process according to claim 20.

28. A processed article obtained by further processing the print according to claim 26.

29. A processed article obtained by further processing the print according to claim 27.

30. The processed article according to claim 28, which is obtained by cutting the printed cloth into desired sizes, and then subjecting each of the cut pieces to processes required to obtain a final processed article.

31. The processed article according to claim 29, which is obtained by cutting the printed cloth into desired sizes, and then subjecting each of the cut pieces to processes required to obtain a final processed article.

32. The processed article according to claim 30, wherein a process required to obtain the final processed article is sewing.

33. The processed article according to claim 31, wherein a process required to obtain the final processed article is sewing.

34. The processed article according to any one of claims 28 to 33, wherein the processed article is apparel.

35. An ink set suitable in ink-jet textile printing, comprising yellow, magenta, cyan and black inks containing respective reactive dyes, wherein reactive dyes contained in the inks of the respective colors are different from one another in reaction rate, and the dye content in the ink containing a slower-reacting dye is lower.

36. An ink set suitable for use in ink-jet textile printing, comprising yellow, magenta, cyan and black inks containing respective reactive dyes, wherein the reactive dyes contained in the inks of the respective colors are different from one another in reaction rate, and the organic solvent content in the ink containing a slower-reacting dye is lower.

37. An ink set suitable in ink-jet textile printing, comprising yellow, magenta, cyan and black inks containing respective reactive dyes, wherein reactive dyes contained in the inks of the respective colors are different from one another in reaction rate, and the pH of the ink containing a slower-reacting dye is higher, and a difference between the pH's of adjacent inks is not less than 0.5.

38. An ink set suitable in ink-jet textile printing, comprising yellow, magenta, cyan and black inks containing respective reactive dyes, wherein reactive dyes contained in the inks of the respective colors are different from one another in reaction rate, and the surface tension of the ink containing a slower-reacting dye is lower.

* * * * *

UNITED STATES PATENT AND TRADEMARK OFFICE

CERTIFICATE OF CORRECTION

PATENT NO. : 5,500,023

DATED : March 19, 1996

INVENTOR(S) : Shoji KOIKE, et al.

It is certified that error appears in the above-indentified patent and that said Letters Patent is hereby corrected as shown below:

COLUMN 5:

Line 58, "$MgCl_{12}$" should read --$MgCl_2$--.

COLUMN 7:

Line 65, "are" should read --is--.

COLUMN 8:

Line 56, "only-adhere" should read --only adhere--.

COLUMN 9:

Line 47, "as will be" should be deleted.

COLUMN 11:

Line 26, "subjecting" should read --subjected--.

COLUMN 12:

Line 24, "subjecting" should read --subjected--; and

Line 60, "subjecting" should read --subjected--.

UNITED STATES PATENT AND TRADEMARK OFFICE

CERTIFICATE OF CORRECTION

PATENT NO. : 5,500,023

DATED : March 19, 1996

INVENTOR(S) : Shoji KOIKE, et al.

It is certified that error appears in the above-indentified patent and that said Letters Patent is hereby corrected as shown below:

COLUMN 13:

Line 27, "subjecting" should read --subjected--.

COLUMN 14:

Line 61, "subjecting" should read --subjected--.

COLUMN 15:

Line 30, "subjecting" should read --subjected--.

COLUMN 18:

Line 47, "for use" should be deleted.

Signed and Sealed this

Tenth Day of September, 1996

Attest:

BRUCE LEHMAN

*Attesting Officer*

*Commissioner of Patents and Trademarks*